(12) United States Patent
Yanniello et al.

(10) Patent No.: US 10,784,659 B2
(45) Date of Patent: Sep. 22, 2020

(54) SWITCHGEAR WITH REMOVABLE CIRCUIT INTERRUPTER CONFIGURATION

(71) Applicant: Eaton Intelligent Power Limited, Dublin (IE)

(72) Inventors: Robert Yanniello, Asheville, NC (US); Eddie Wilkie, Fletcher, NC (US)

(73) Assignee: Eaton Intelligent Power Limited (IE)

( * ) Notice: Subject to any disclaimer, the term of this patent is extended or adjusted under 35 U.S.C. 154(b) by 0 days.

(21) Appl. No.: 15/935,435

(22) Filed: Mar. 26, 2018

(65) Prior Publication Data

US 2019/0296528 A1 Sep. 26, 2019

(51) Int. Cl.
| | |
|---|---|
| *H02B 11/02* | (2006.01) |
| *H02B 11/167* | (2006.01) |
| *H02B 13/00* | (2006.01) |
| *H02B 11/12* | (2006.01) |
| *H02B 13/045* | (2006.01) |
| *H02B 11/04* | (2006.01) |

(Continued)

(52) U.S. Cl.
CPC ............ *H02B 11/02* (2013.01); *H02B 11/12* (2013.01); *H02B 11/167* (2013.01); *H02B 13/00* (2013.01); *H02B 11/04* (2013.01); *H02B 11/20* (2013.01); *H02B 13/045* (2013.01); *H02B 13/055* (2013.01)

(58) Field of Classification Search
USPC ........................................................ 361/606
See application file for complete search history.

(56) References Cited

U.S. PATENT DOCUMENTS

| 3,899,722 A | 8/1975 | Cadez et al. |
| 4,880,947 A * | 11/1989 | Fey .................. H01H 33/66207 218/118 |

(Continued)

FOREIGN PATENT DOCUMENTS

| CN | 201 061 096 Y | 5/2008 |
| CN | 103 618 215 A | 3/2014 |

(Continued)

OTHER PUBLICATIONS

*Eaton Vacuum Interruption (EVI) Technology*, Eaton Corporation Product Guide, Nov. 2011, 8 pages.

(Continued)

*Primary Examiner* — Mukundbhai G Patel
(74) *Attorney, Agent, or Firm* — Stanek Lemon Crouse & Meeks, P.A.

(57) ABSTRACT

An apparatus includes a housing having a gas-insulated compartment and a non-gas-insulated receptacle therein. The receptacle is disposed adjacent to the gas-insulated compartment and configured for removable insertion of a circuit interrupter assembly therein. A bus is disposed in the gas-insulated compartment, and a contact is disposed in the receptacle, electrically coupled to the bus in the gas-insulated compartment and configured to mate with a terminal of the circuit interrupter assembly when the circuit interrupter assembly is installed in the receptacle. The receptacle may be configured for insertion of an insulation-encapsulated circuit interrupter pole unit and the apparatus may include at least one flexible insulation member attached to a side wall of the receptacle and configured to engage a sidewall of the pole unit.

17 Claims, 10 Drawing Sheets

(51) Int. Cl.
H02B 11/20 (2006.01)
H02B 13/055 (2006.01)

(56) References Cited

U.S. PATENT DOCUMENTS

| | | | |
|---|---|---|---|
| 5,191,180 A * | 3/1993 | Kitamura | H01H 33/666 218/135 |
| 8,178,801 B2 | 5/2012 | Vanniello et al. | |
| 8,717,742 B2 * | 5/2014 | Kim | H02B 11/12 361/612 |
| 2008/0308531 A1 * | 12/2008 | Tsuchiya | H01H 33/6661 218/118 |
| 2013/0170104 A1 | 7/2013 | Kim | |
| 2014/0131182 A1 | 5/2014 | Leccia | |
| 2017/0179711 A1 * | 6/2017 | Numata | H02B 13/025 |

FOREIGN PATENT DOCUMENTS

| | | |
|---|---|---|
| EP | 2 405 546 A2 | 1/2012 |
| JP | 2012-200143 A | 10/2012 |

OTHER PUBLICATIONS

Notification of Transmittal of the International Search Report and the Written Opinion of the International Searching Authority, PCT/EP2019/02566, dated May 29, 2019, 15 pages.

* cited by examiner

SWITCHGEAR WITH REMOVABLE CIRCUIT INTERRUPTER CONFIGURATION

BACKGROUND

The inventive subject matter relates to electrical apparatus and, more particularly, to switchgear.

In typical gas-insulated switchgear (GIS), certain components that are prone to arc generation are placed in closed structures filled with an insulating high-dielectric gas, such as sulfur hexafluoride ($SF_6$). The insulation properties of the gas allow reduced spacing between components and thus enable relatively compact arrangement of the switchgear components. While high-voltage (e.g., 50 kV and above) switchgear is commonly gas-insulated, medium-voltage circuit breakers and other medium-voltage devices may also utilize gas insulated switching components to provide compact form factors for particular industrial and other applications.

A conventional GIS unit may include a housing having one or more gas containment compartments therein filled with insulating gas (e.g., $SF_6$). Circuit interrupters, buses and other components may be housed in the one or more gas containment compartments, such as described in U.S. Pat. No. 8,717,742 to Kim. Lower voltage control circuitry and mechanisms for operating the circuit interrupters may be housed in one or more control compartments, which may not be filled with insulating gas.

SUMMARY OF THE INVENTION

Some embodiments of the inventive subject matter provide an apparatus including a housing having a gas-insulated compartment and a non-gas-insulated receptacle therein. The non-gas-insulated receptacle is disposed adjacent to the gas-insulated compartment and configured for removable insertion of a circuit interrupter assembly therein. A bus is disposed in the gas-insulated compartment, and a contact is disposed in the non-gas-insulated receptacle, electrically coupled to the bus in the gas-insulated compartment and configured to mate with a terminal of the circuit interrupter assembly when the circuit interrupter assembly is installed in the non-gas-insulated receptacle.

In some embodiments, the non-gas-insulated receptacle may be configured for insertion of a circuit interrupter pole unit therein and the apparatus may further include at least one flexible insulation member attached to a side wall of the non-gas-insulated receptacle. The at least one flexible insulation member may be configured to engage a sidewall of the pole unit to form an environmental seal when the pole unit is inserted in the non-gas-insulated receptacle. The at least one flexible insulation member may include a plurality of flexible insulating members spaced apart along the side wall of the non-gas-insulated receptacle.

According to some embodiments, the contact may include a first contact configured to mate with the terminal when the circuit interrupter assembly is inserted in the non-gas-insulated receptacle at a first position and the apparatus may further include a second contact configured to mate with the terminal when the circuit interrupter assembly is inserted in the non-gas-insulated receptacle in a second position. The first position may be a fully inserted position and the second position may be a partially inserted position. The second contact may include a grounding contact external to the non-gas-insulated receptacle.

In some embodiments, the housing may include a switchgear enclosure having a bay configured to receive a truck supporting the circuit interrupter assembly. In further embodiments, the non-gas-insulated receptacle may be positioned over the bay and configured to receive a circuit interrupter assembly inserted vertically into the non-gas-insulated receptacle from the truck.

Further embodiments provide an apparatus including a housing having a gas-insulated compartment and a receptacle adjacent to the gas-insulated compartment and configured for removable insertion of an insulation-encapsulated circuit interrupter pole unit therein. A bus is disposed in the gas-insulated compartment and a contact is disposed in the receptacle, electrically coupled to the bus in the gas-insulated compartment and configured to mate with a terminal of the pole unit when the pole unit is installed in the receptacle. At least one flexible insulation member may be attached to the sidewall of the receptacle. The contact may include a first contact configured to mate with the terminal when the pole unit is in a first position and the apparatus may further include a second contact configured to mate with the terminal when the pole unit is in second position.

DETAILED DESCRIPTION

Figure 1:
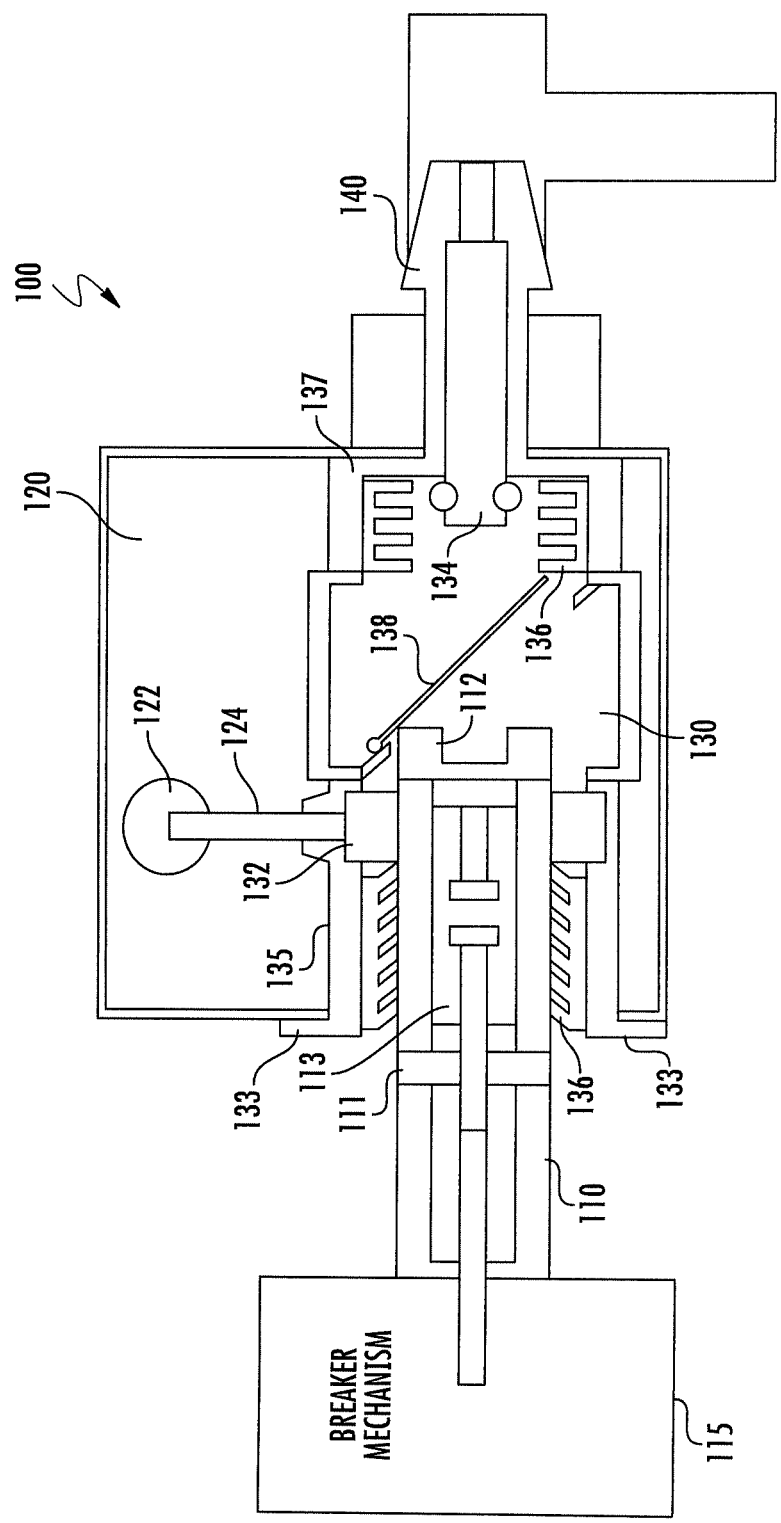
FIG. 1 is a schematic diagram illustrating a drawout circuit interrupter arrangement according to some embodiments of the inventive subject matter.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Figure 2:
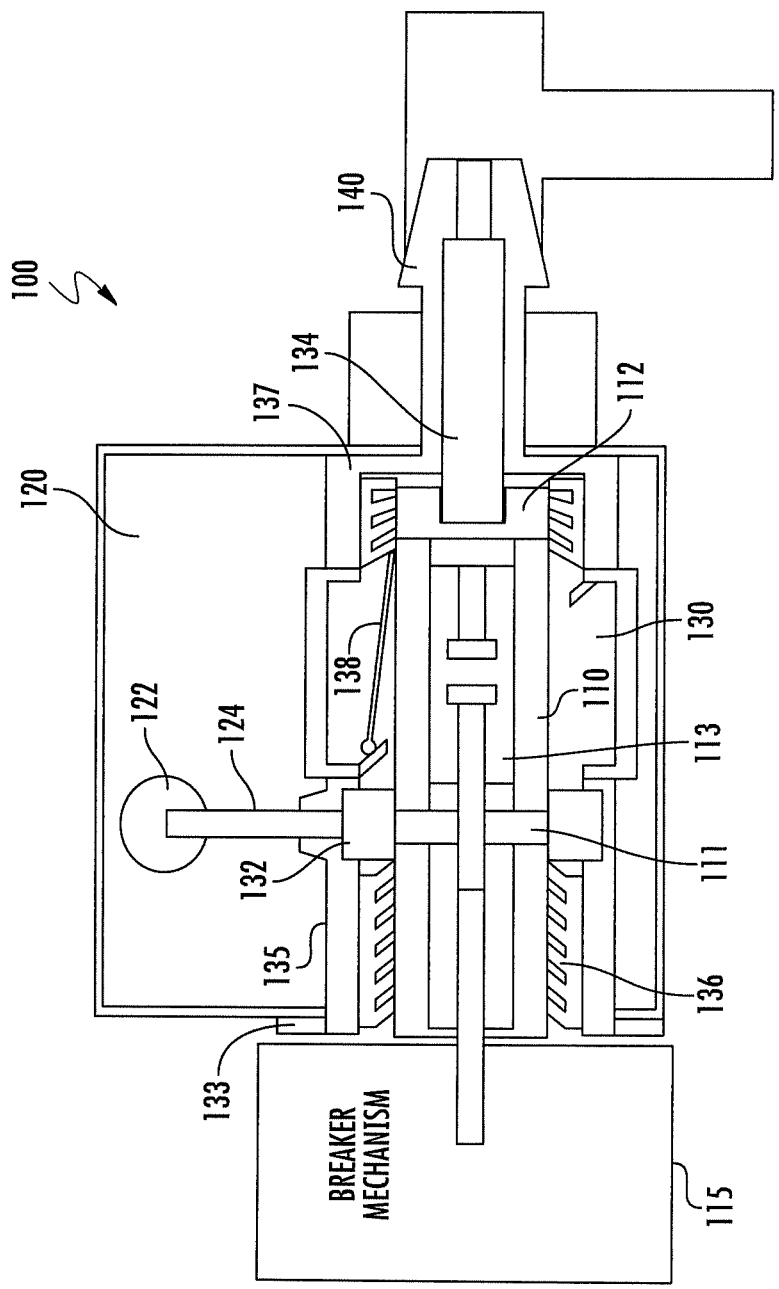
FIG. 2 is a schematic diagram illustrating the circuit interrupter arrangement of FIG. 1 in a fully inserted condition.

FIGS. 1 and 2 schematically illustrate an apparatus 100 according to some embodiments of the inventive subject matter. The apparatus 100 includes a housing having a gas-insulated compartment 120 and a receptacle 130 therein. In keeping with terminology commonly used in the electrical switchgear industry, "gas-insulated" refers to insulation using a relatively high dielectric gas (e.g., a pure gas or gas mixture) that has a controlled composition that provides enhanced insulation with respect to, for example, air with an uncontrolled composition. The insulation gas used in a gas-insulated switchgear component may include, for example, a high-dielectric halogenated gas, such as sulfur hexafluoride ($SF_6$) and/or alternatives thereto, such as fluorinated gas (e.g., fluoroketone-based) mixtures. It will be appreciated that the composition of such an insulation gas may be maintained, for example, by containment of the insulation gas within a sealed compartment (e.g., the gas-insulated compartment 120) and/or by control of the gas composition in the compartment using an active control system that controls, for example, humidity or other parameters.

Disposed adjacent to the gas-insulated compartment 120, the non-gas-insulated receptacle 130 is configured to removably receive a circuit interrupter assembly. As shown, the circuit interrupter assembly may be an insulation-encapsulated pole unit 110 comprising a circuit interrupter unit 113 (e.g., a vacuum circuit interrupter unit) encapsulated in an insulating material (e.g., epoxy resin) and having externally-accessible first and second terminals 111, 112 located at side (at an intermediate position with respect to the ends) and an end, respectively, of the pole unit 110. First and second contacts 132, 134 are disposed at a sidewall 135 and an end wall 137, respectively, within the receptacle 130. The first and second contacts 132, 134 are configured to mate with the first and second terminals 111, 112 of the pole unit 110 when the pole unit 110 is fully inserted into the receptacle 130, as shown in FIG. 2.

The first contact 132 is electrically coupled to bus 122 in the gas-containment compartment 120, here by a conductor 124 that passes through the sidewall 135 and into the gas-insulated compartment 120. The second contact 134 may be configured to be coupled to an external conductor, such as a connector 140 for a cable. Although a single bus 122 is shown, it will be understood that multiple such buses may be disposed in the gas-insulated compartment 120, e.g., three buses configured to be coupled to respective pole units in respective receptacles like the receptacle 130.

The receptacle 130 may also be equipped with additional features to enhance performance. For example, a gasket 133 may be provided adjacent to the opening of receptacle 130 such that when the pole unit 110 is fully inserted into the receptacle 130, a seal is formed between the assembly 100 and an operating mechanism housing 115 to which the pole unit 110 is attached, thus reducing the likelihood of contamination of the structures in the receptacle 130 from the ambient environment. As shown, one or more flexible insulating members 136 (e.g., elastomeric skirts) may be affixed to sidewalls of the receptacle 130. The flexible members 136 may increase the dielectric withstand capability of the arrangement, may guide insertion of the pole unit 110 into the receptacle 130 and may engage the inserted pole unit 110 such that an environmental seal is formed that further reduces the likelihood contaminants entering the receptacle 130 when the pole unit 110 is inserted therein. In some embodiments, a pole unit along the lines of pole unit 110 may be fitted with flexible sealing members that perform a similar function by engaging sidewalls of a receptacle along the lines of the receptacle 120 when the pole unit is inserted, similar to the flexible disks/skirts described in U.S. Pat. No. 8,178,801 to Yanniello et al., the disclosure of which is hereby incorporated by reference. As further shown, a moveable shutter 138 may be provided in the receptacle 130 to provide additional protection.

Figure 3:
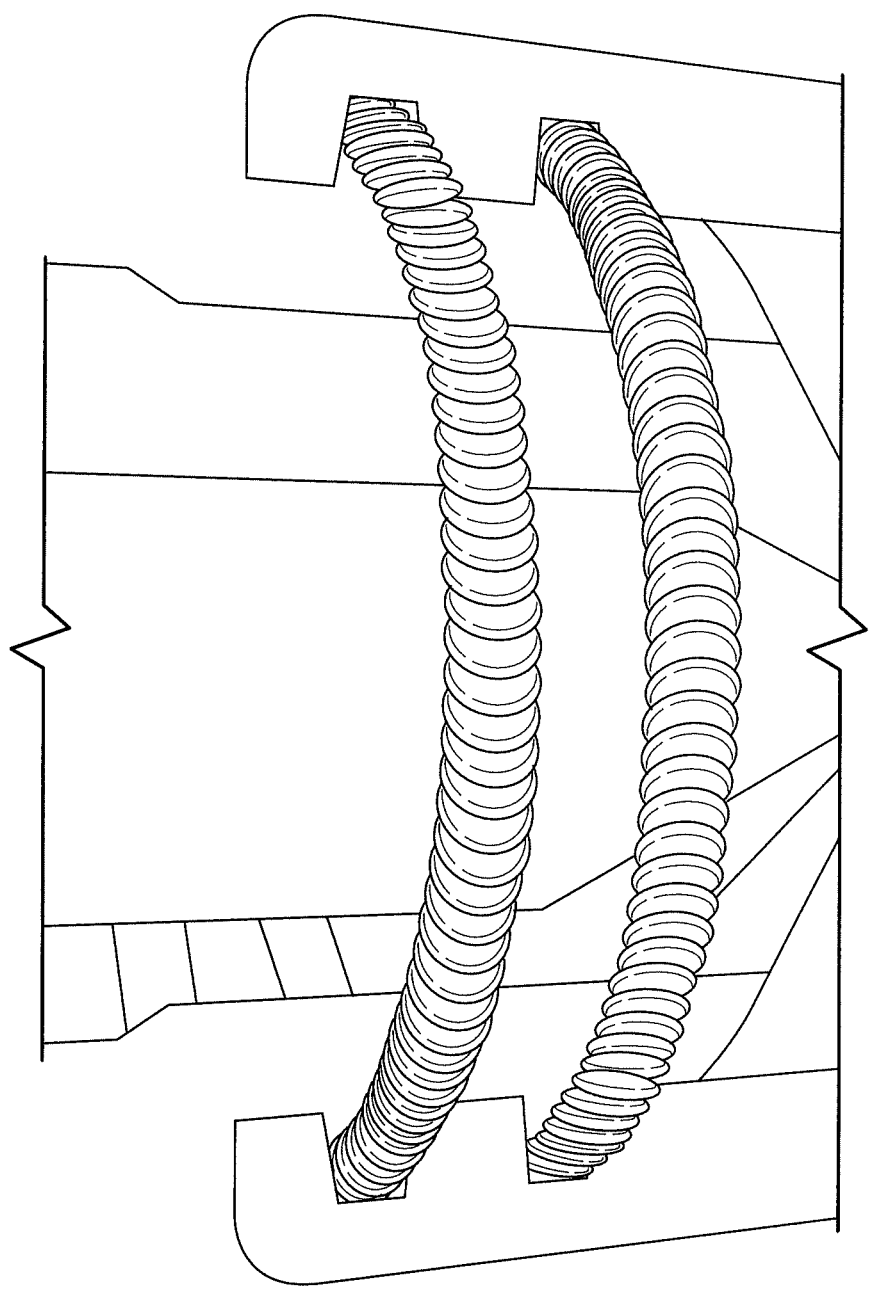
FIG. 3 illustrates a spring-bearing-type contact structure that may be used with the circuit interrupter of FIG. 1 according to some embodiments.

A variety of different types of contact arrangements may be used. For example, selected ones of the first and second terminals 111, 112 of the pole unit 110 and the first and second contacts 132, 134 may be respective spring bearing type contacts, such as the contacts manufactured by Bal Seal Engineering, Inc. An example of such a contact is shown in FIG. 3, which depicts a spring-bearing-type contact that is configured to contact a conductive outer surface of a cylindrical member. Mating ones of the terminals 111, 112 or the first and second contacts 132, 134 may be conductive rings or other structures that have surfaces configured to engage such contacts. It will be understood, however, that other types of contacts may be used. It will be further appreciated that although the circuit interrupter assemblies show in FIGS. 1 and 2 are configured for use with pole units having side and end terminals, receptacle structures configured for use with other types of circuit interrupter assembly arrangements may be used, such as pole units with other terminal arrangements or circuit interrupter assemblies having non-vacuum switching mechanisms. Other mechanisms, such as disconnect switches and sensors, could also be included in such removable circuit interrupter assemblies.

Figure 4:
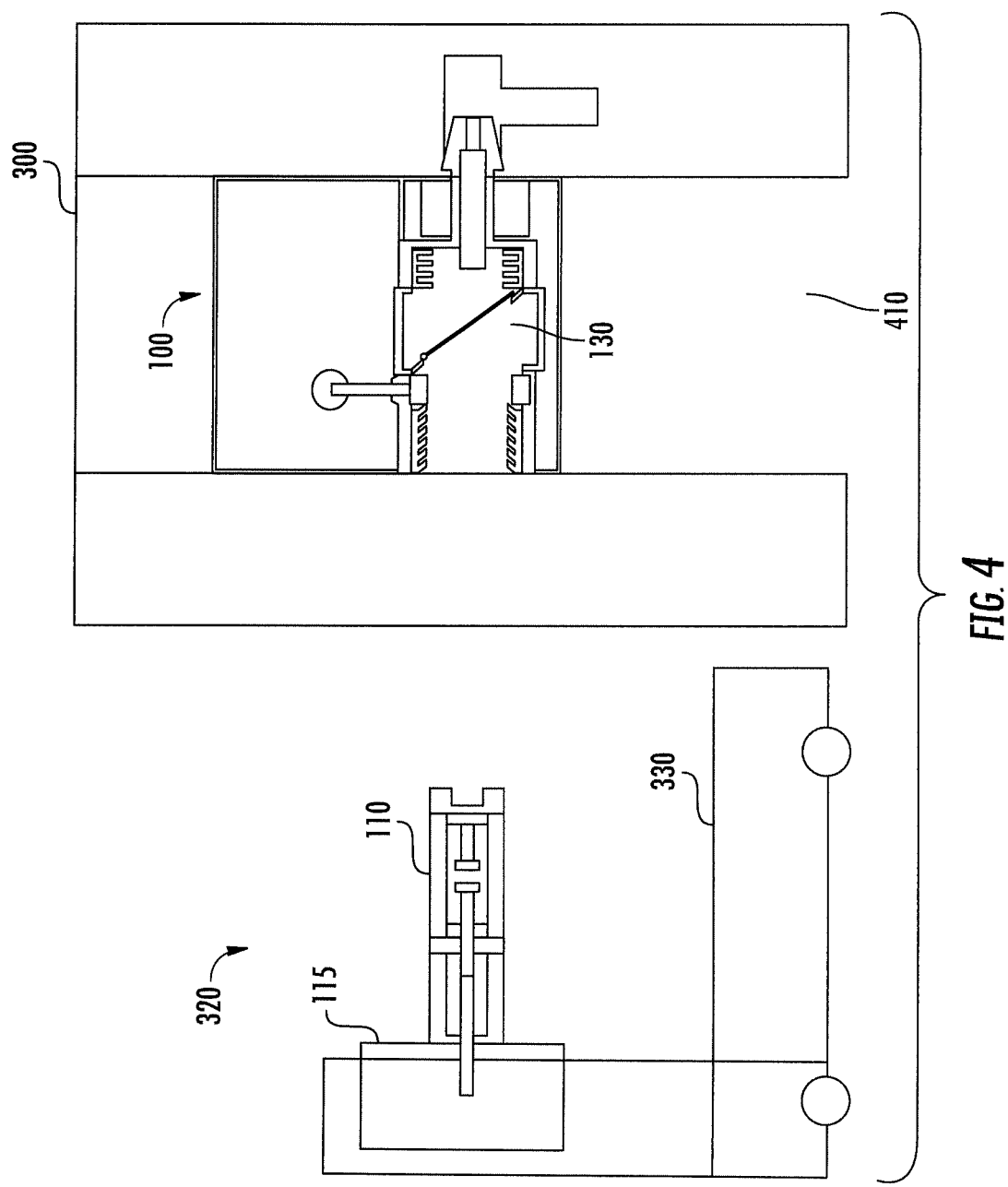
FIG. 4 is a schematic diagram illustrating a drawout circuit interrupter arrangement according to further embodiments of the inventive subject matter.
Figure 5:
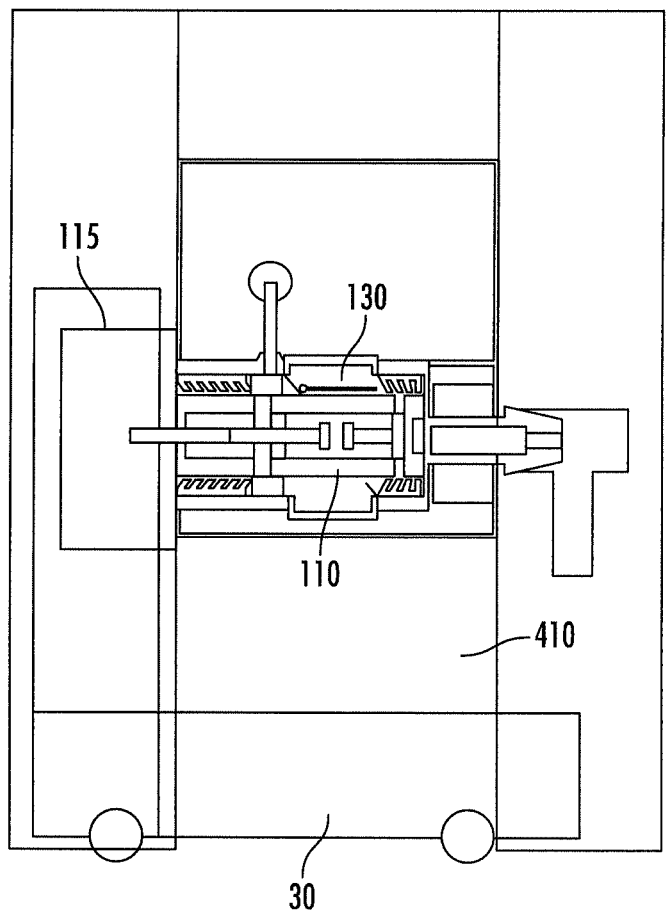
FIG. 5 is a schematic diagram illustrating the arrangement of FIG. 4 in a fully inserted condition.

FIGS. 4 and 5 illustrate an example application of the apparatus 100 of FIGS. 1 and 2. In particular, the apparatus 100 may be disposed in a switchgear housing 300. The pole unit 110 may be part of a drawout circuit breaker assembly 320, wherein the pole unit 110 and the operating mechanism housing 115 may be mounted on a rolling truck 330 configured to roll in and out of a bay 410 of the switchgear housing 300, such that, when the circuit breaker assembly 320 is rolled into the bay 410, the pole unit 110 is inserted into the receptacle 130 of the apparatus 100. Although FIGS. 4 and 5 illustrate a single pole unit 110 on the truck 330, it will be understood that multiple pole units (e.g., for respective phases) may be supported by the truck 330 and may be configured to be inserted into respective receptacles like the receptacle 130 in the manner shown in FIGS. 4 and 5.

Figure 6:
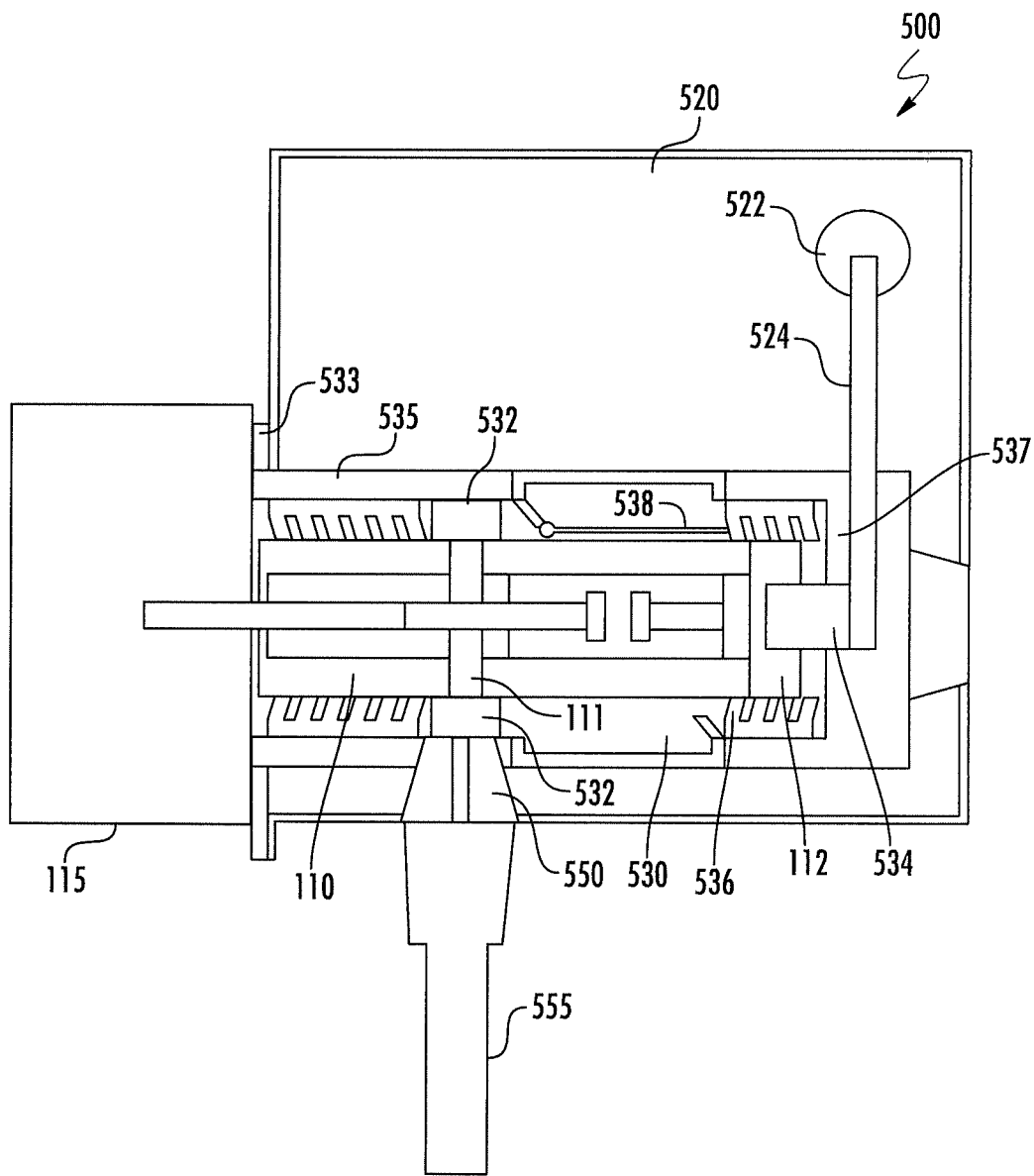
FIG. 6 is a schematic diagram illustrating a drawout circuit interrupter arrangement according to some embodiments of the inventive subject matter.
Figure 7:
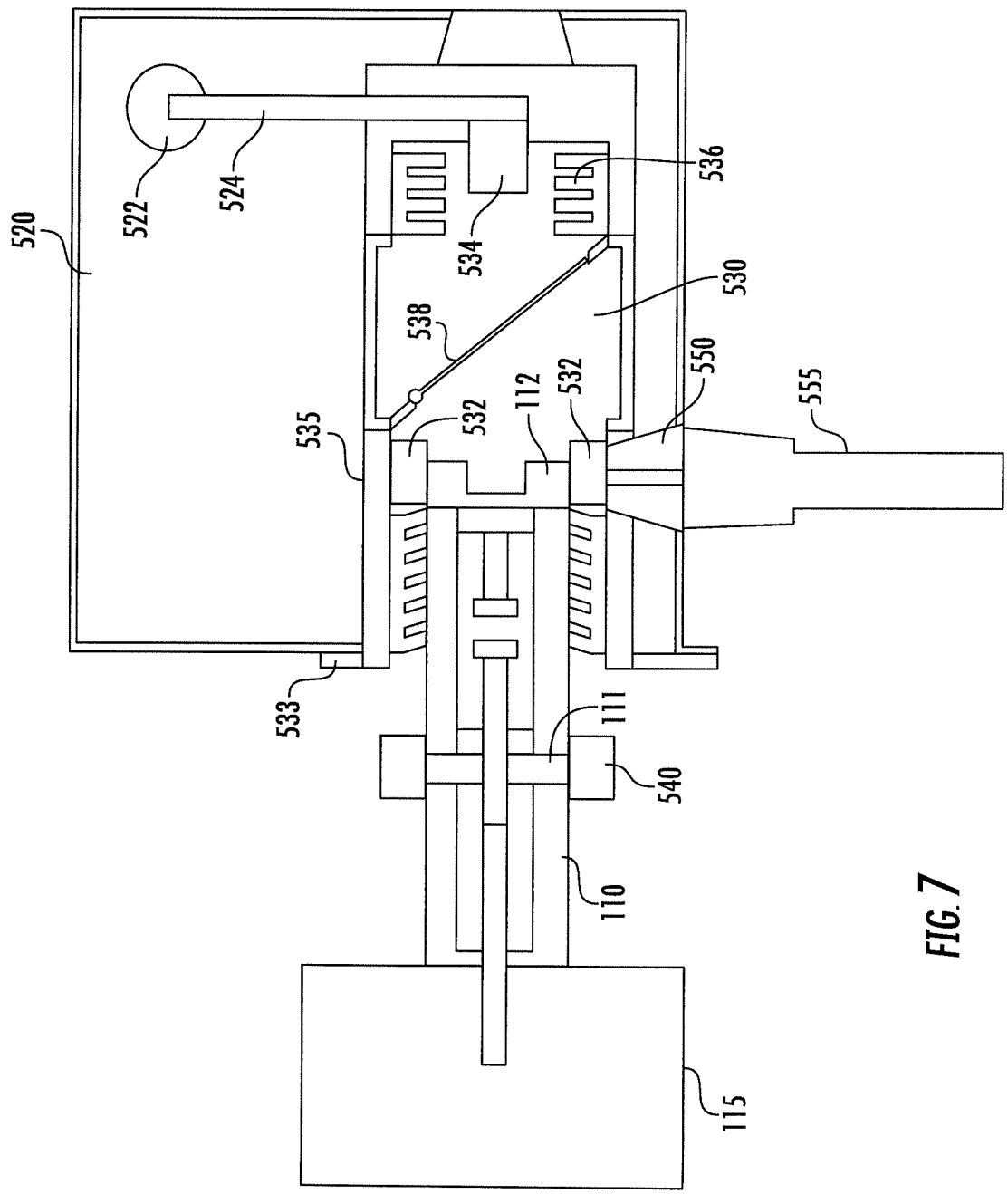
FIG. 7 is a schematic diagram illustrating the arrangement of FIG. 4 in a partially inserted condition that provides conductor grounding according to some embodiments of the inventive subject matter.

In some embodiments, different conductor arrangements may be used. For example, FIGS. 6 and 7 illustrate an apparatus 500 including a housing 510 with a gas-containing compartment 520 and an adjacent receptacle 530. A first contact 532 on a sidewall 535 in the receptacle 530 is configured to mate with a side terminal 111 of a pole unit 110 and a second contact 534 at an end wall 537 of the receptacle 530 is configured to mate with an end terminal 112 of the pole unit 110 when the pole unit 110 is fully inserted into the receptacle 530. Unlike the afore-described embodiments, the end wall contact 534 is coupled to a bus 522 in the gas-insulated compartment 520 via a conductor 524 that passes through the end wall 537. A cable 555 may be coupled to the sidewall contact 532 via a connector 550. Environmental sealing of the receptacle 530 may be provided by a gasket 533 and/or flexible insulating members 536 at sidewalls of the receptacle 530. A shutter 538 can provide additional protection, along lines described above.

As shown in FIG. 7, in some embodiments, partial insertion/removal of the pole unit 110 may be used to enable grounding of the cable 555 for safety during, for example, maintenance procedures. In particular, the pole unit 110 may be partially removed to a point in which the end terminal 112 of the pole unit 110 contacts the first contact 532 in the receptacle 530 and the side terminal 111 of the pole unit 110 contacts a ground contact 540 external to the receptacle 530, allowing the cable 555 to be grounded via closure of the circuit interrupter of the pole unit 110. This arrangement may, for example, eliminate the need for an additional grounding switch.

Figure 8:
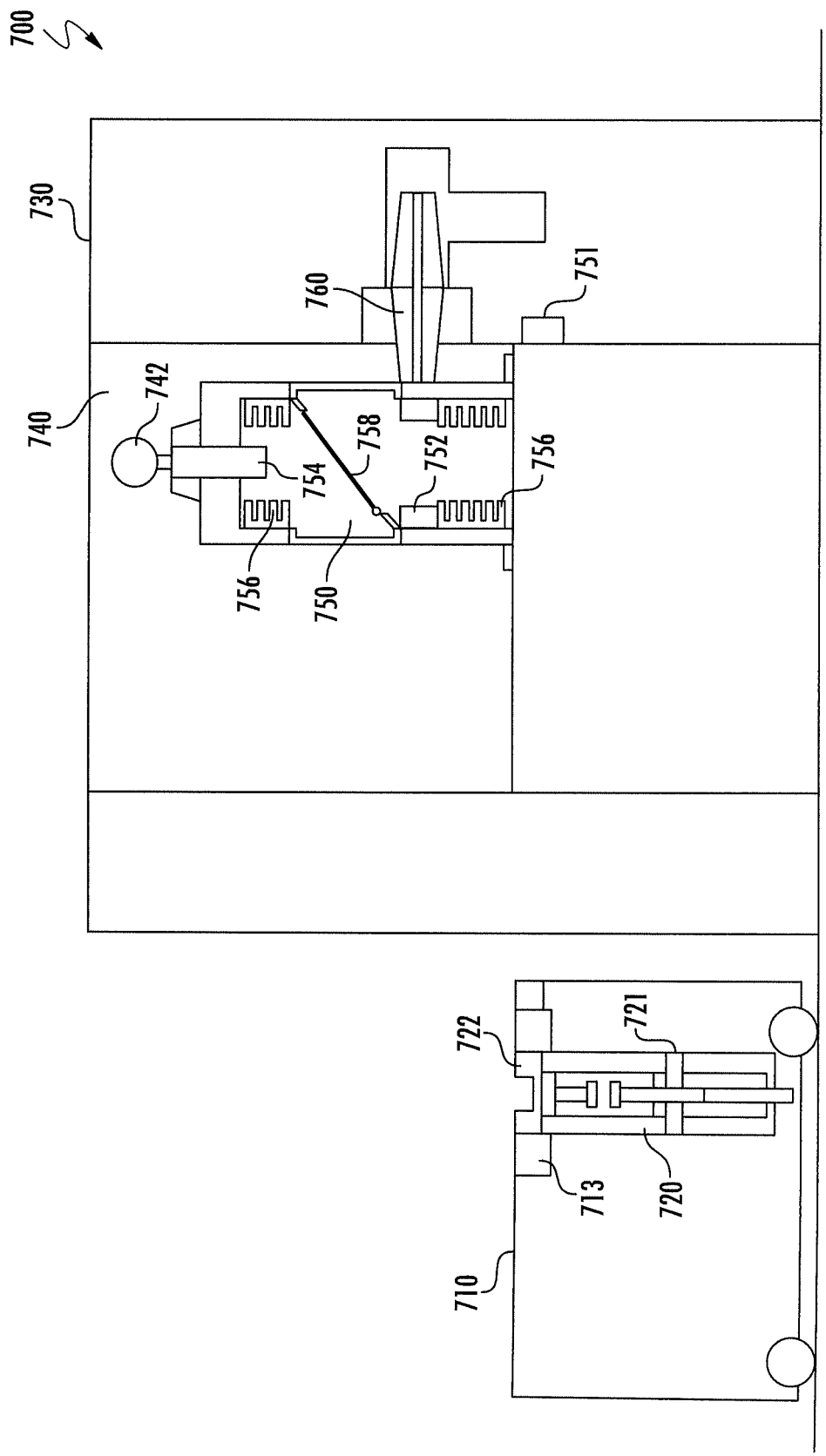
FIG. 8 is a schematic diagram illustrating a drawout circuit interrupter arrangement according to some embodiments of the inventive subject matter.
Figure 9:
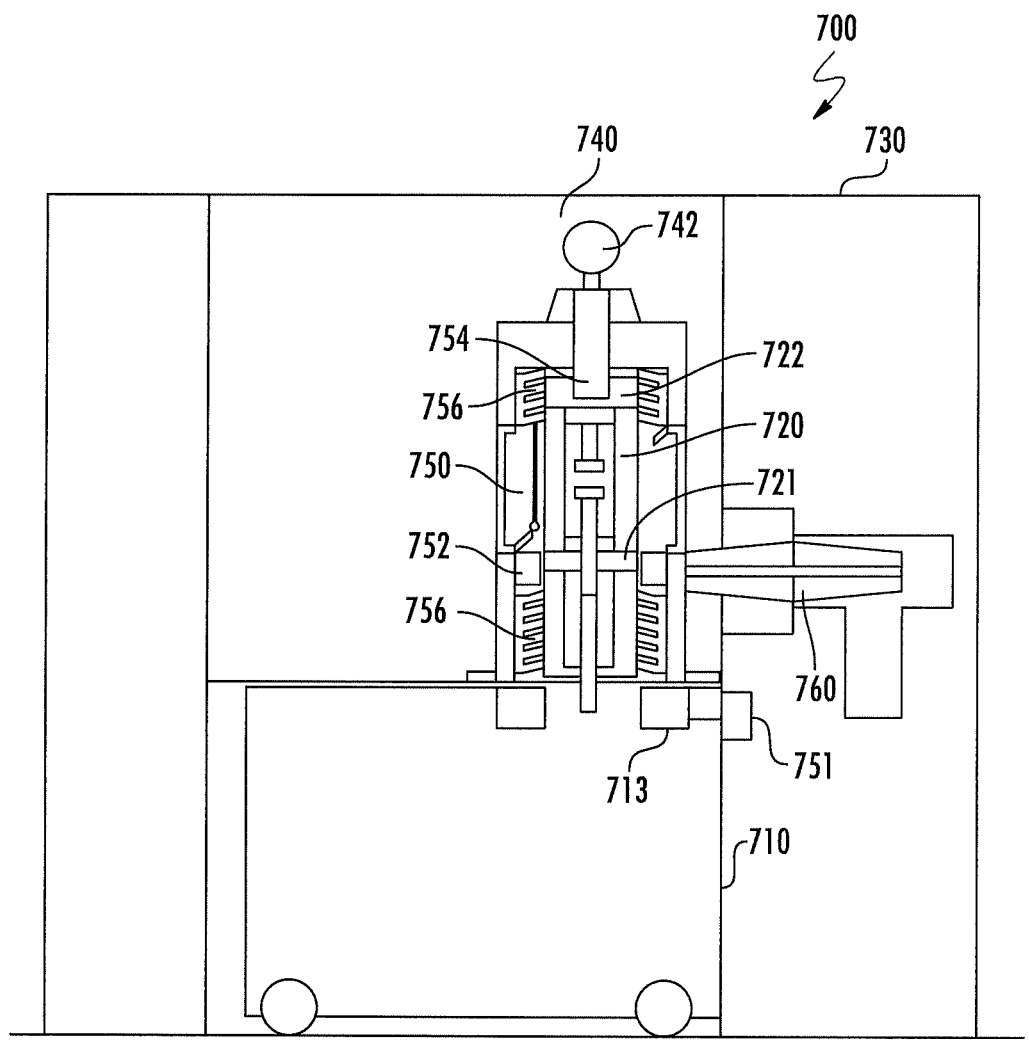
FIG. 9 is a schematic diagram illustrating the circuit interrupter arrangement of FIG. 8 in a fully inserted condition according to further embodiments of the inventive subject matter.
Figure 10:
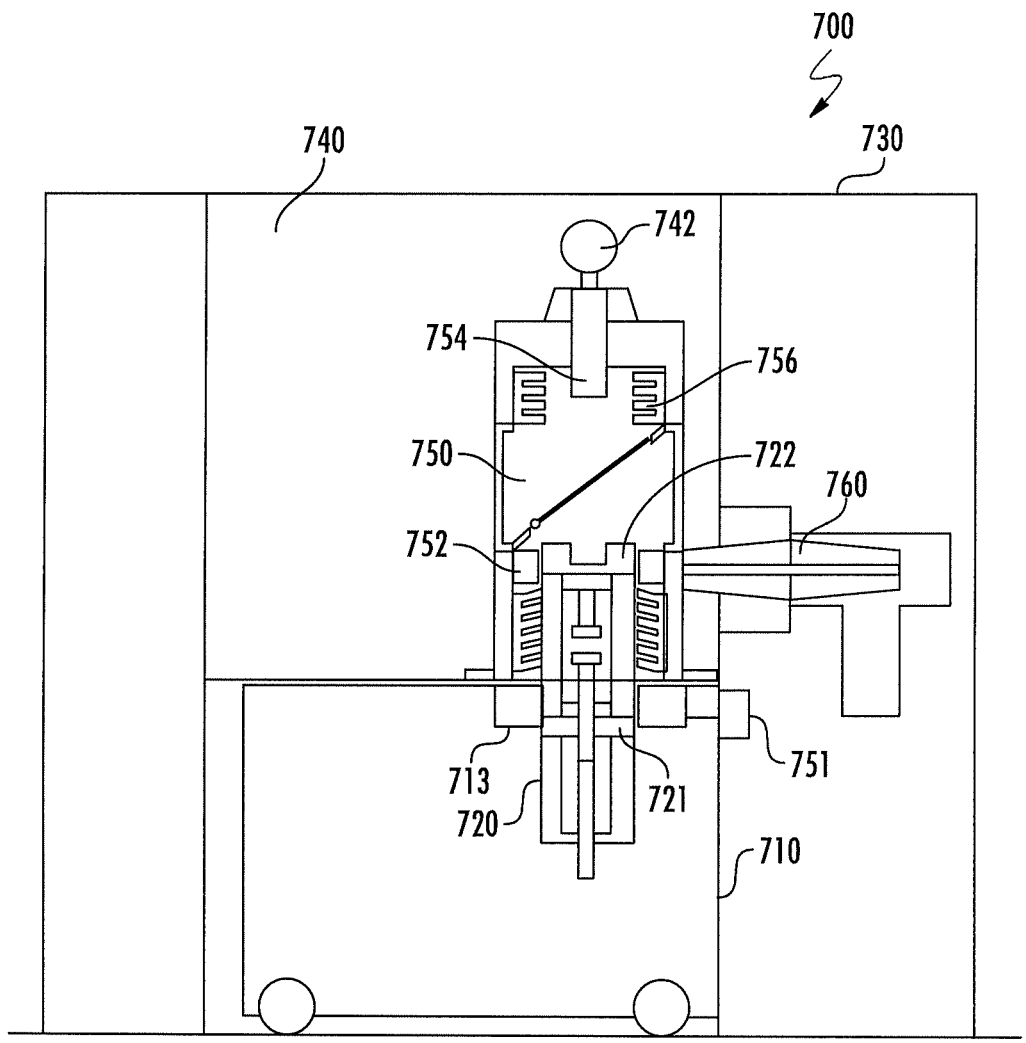
FIG. 10 is a schematic diagram illustrating the circuit interrupter arrangement of FIG. 8 in a partially inserted condition that supports conductor grounding according to further embodiments of the inventive subject matter.

It will be appreciated that further embodiments may use other arrangements. For example, FIGS. 8-10 illustrate a switchgear assembly having a gas-containment compartment 740 disposed adjacent to a circuit interrupter receptacle 750 that is configured to receive a vertically-oriented circuit interrupter pole unit 720 carried on a truck 710. First and second contacts 752, 754 within the circuit interrupter receptacle 750 are configured to mate with a side terminal 721 and an end terminal 722, respectively, of the pole unit 720 when it is fully inserted into the circuit interrupter receptacle 750. The first contact 752 is configured to be coupled to a cable 765 via a cable connector 760, while the second contact 754 is electrically coupled to a bus 742 in the gas-containment compartment 740. Environmental protection and/or increased dielectric isolation may be provided by flexible insulating members 756, and further protection may be provided by a shutter 758. As further shown in FIG. 10, a partially withdrawn grounding position may be provided wherein the side terminal 721 of the pole unit 720 may contact a grounding contact 713 in the truck 710. The grounding contact 713 may, in turn, be connected to a grounding contact 751 within the housing of the switchgear 700.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. An apparatus comprising:
   a housing having a gas-insulated compartment configured to contain a type of insulating gas therein and a receptacle disposed outside of and adjacent to the gas-insulated compartment and configured for insertion of a circuit interrupter assembly therein wherein the receptacle comprises at least one flexible insulation member attached to a sidewall of the receptacle and configured to engage an insulated sidewall of the circuit interrupter assembly when the circuit interrupter assembly is installed in the receptacle;
   a bus in the gas-insulated compartment; and
   a contact in the receptacle, electrically coupled to the bus in the gas-insulated compartment and configured to mate with a terminal of the circuit interrupter assembly when the circuit interrupter assembly is installed in the receptacle.

2. The apparatus of claim 1, wherein the at least one flexible insulation member is configured to engage an insulated sidewall of the circuit interrupter assembly to form an environmental seal when the circuit interrupter assembly is inserted in the receptacle.

3. The apparatus of claim 2, wherein the at least one flexible insulation member comprises a plurality of flexible insulating members spaced apart along the side wall of the receptacle.

4. The apparatus of claim 1, wherein the receptacle is configured for insertion of a circuit interrupter pole unit therein and wherein the contact is configured to mate with a terminal at a side or an end of the pole unit.

5. The apparatus of claim 1, wherein the contact comprises a first contact and wherein the apparatus further comprises a second contact in the receptacle and configured to be electrically coupled to a conductor outside of the receptacle and the gas-insulated compartment.

6. The apparatus of claim 5, wherein the receptacle is configured for insertion of a circuit interrupter pole unit therein and wherein the first contact is configured to mate with a first terminal disposed on a sidewall of the pole unit and wherein the second contact is configured to mate with a second terminal on an end of the pole unit.

7. The apparatus of claim 6, wherein the receptacle is configured for insertion of a circuit interrupter pole unit therein and wherein the second contact is configured to mate with a first terminal at a sidewall of the pole unit and wherein the first contact is configured to mate with a contact on an end of the pole unit.

8. The apparatus of claim 1, wherein the contact comprises a first contact configured to mate with the terminal when the circuit interrupter assembly is inserted in the receptacle at a first position and wherein the apparatus further comprises a second contact configured to mate with the terminal when the circuit interrupter assembly is inserted in the receptacle in a second position.

9. The apparatus of claim 8, wherein the first position is a fully inserted position and wherein the second position is a partially inserted position.

10. The apparatus of claim 8, wherein the second contact comprises a grounding contact external to the receptacle.

11. The apparatus of claim 1, wherein the housing comprises a switchgear enclosure having a bay configured to receive a truck supporting the circuit interrupter assembly.

12. The apparatus of claim 11, wherein the receptacle is positioned over the bay and configured to receive a circuit interrupter assembly inserted vertically into the receptacle from the truck.

13. The apparatus of claim 1, wherein the circuit interrupter assembly comprises an externally insulated circuit interrupter unit.

14. An apparatus comprising:
- a housing having a gas-insulated compartment and a receptacle therein, the receptacle disposed adjacent to the gas-insulated compartment and configured for removable insertion of an insulation-encapsulated circuit interrupter pole unit therein;
- a bus in the gas-insulated compartment;
- a contact in the receptacle, electrically coupled to the bus in the gas-insulated compartment and configured to mate with a terminal of the pole unit when the pole unit is installed in the receptacle; and
- at least one flexible insulation member mounted in the receptacle such that it is disposed between a wall of the receptacle and an insulated sidewall of the pole unit and contacts the insulated sidewall of the pole unit when the pole unit is installed in the receptacle.

15. The apparatus of claim 14, wherein the at least one flexible insulation member is attached to the wall of the receptacle.

16. The apparatus of claim 14, wherein the contact comprises a first contact configured to mate with the terminal when the pole unit is in a first position and wherein
- the apparatus further comprises a second contact configured to mate with the terminal when the pole unit is in second position.

17. The apparatus of claim 16, wherein the second contact comprises a grounding contact outside of the receptacle.

* * * * *